(12) United States Patent
Ko

(10) Patent No.: US 7,542,388 B2
(45) Date of Patent: Jun. 2, 2009

(54) RECORDING MEDIUM FOR STORING DEFECT MANAGEMENT INFORMATION FOR RECORDING REAL TIME DATA, DEFECT MANAGING METHOD THEREFOR, AND REAL TIME DATA RECORDING METHOD

(75) Inventor: Jung-wan Ko, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/022,350

(22) Filed: Jan. 30, 2008

(65) Prior Publication Data

US 2008/0117780 A1  May 22, 2008

Related U.S. Application Data

(60) Continuation of application No. 11/295,593, filed on Dec. 7, 2005, which is a continuation of application No. 10/631,826, filed on Aug. 1, 2003, now Pat. No. 7,133,333, which is a continuation of application No. 10/107,395, filed on Mar. 28, 2002, now Pat. No. 6,643,232, which is a division of application No. 09/294,344, filed on Apr. 20, 1999, now Pat. No. 6,480,446.

(30) Foreign Application Priority Data

| Apr. 20, 1998 | (KR) | 98-14059 |
| Jun. 24, 1998 | (KR) | 98-23913 |
| Jul. 23, 1998 | (KR) | 98-29733 |
| Aug. 27, 1998 | (KR) | 98-34880 |
| Sep. 1, 1998 | (KR) | 98-35847 |

(51) Int. Cl.
  *G11B 5/09* (2006.01)

(52) U.S. Cl. .............. 369/47.14; 369/275.3; 369/53.17; 369/53.36

(58) Field of Classification Search .............. 369/53.17, 369/53.25, 53.15, 53.16, 53.24, 53.35, 53.36, 369/47.14, 275.3; 714/723, 747, 5–8
See application file for complete search history.

(56) References Cited

U.S. PATENT DOCUMENTS 4,819,218 A   4/1989   Barnard (Continued)

FOREIGN PATENT DOCUMENTS

EP   0 383 298   8/1990

(Continued)

OTHER PUBLICATIONS

"Standard ECMA-272:120mm DVD Rewritable Disk (DVD-RAM)"; Feb. 1998, XP-002114221, pp. 43-51.

(Continued)

*Primary Examiner*—Ali Neyzari
(74) *Attorney, Agent, or Firm*—Stein McEwen, LLP

(57) ABSTRACT

A recording medium for storing defect management information to record real time data, a defect managing method therefor, and a method of recording real time data. The recording medium stores information representing use or non-use of linear replacement defect management in which a defective area on the recording medium is replaced with the spare area, in order to record real time data. While maintaining compatibility between the defect managing method and a defect managing method based on a current DVD-RAM standard, i.e., while allowing a report of the fact that there are blocks which have not been linearly replaced, linear replacement is not performed when real time data is recorded. Thus, real time data can be recorded and reproduced.

1 Claim, 10 Drawing Sheets

U.S. PATENT DOCUMENTS

| | | | |
|---|---|---|---|
| 4,873,679 | A | 10/1989 | Murai et al. |
| 4,984,230 | A | 1/1991 | Satoh et al. |
| 5,111,444 | A | 5/1992 | Fukushima et al. |
| 5,130,969 | A | 7/1992 | Sako et al. |
| 5,138,599 | A | 8/1992 | Fukushima et al. |
| 5,173,886 | A | 12/1992 | Satoh et al. |
| 5,185,733 | A | 2/1993 | Finkelstein et al. |
| 5,214,627 | A | 5/1993 | Nakashima et al. |
| 5,233,576 | A | 8/1993 | Curtis et al. |
| 5,237,553 | A | 8/1993 | Fukushima et al. |
| 5,255,261 | A | 10/1993 | Iida et al. |
| 5,265,230 | A | 11/1993 | Saldanha et al. |
| 5,283,790 | A | 2/1994 | Kawashita |
| 5,305,302 | A | 4/1994 | Hardwick |
| 5,327,553 | A | 7/1994 | Jewett et al. |
| 5,404,357 | A | 4/1995 | Ito et al. |
| 5,528,571 | A | 6/1996 | Funahashi et al. |
| 5,574,708 | A | 11/1996 | Kawakami |
| 5,715,221 | A | 2/1998 | Ito et al. |
| 5,805,547 | A | 9/1998 | Yamamuro |
| 5,859,823 | A | 1/1999 | Yamamuro |
| 5,914,928 | A | 6/1999 | Takahashi |
| 5,982,729 | A | 11/1999 | Yamamuro |
| 6,031,804 | A | 2/2000 | Yamamuro |
| 6,049,515 | A | 4/2000 | Yamamuro |
| 6,314,235 | B1 | 11/2001 | Gotoh et al. |
| 6,377,524 | B1 | 4/2002 | Ko |
| 6,414,923 | B1 | 7/2002 | Park et al. |
| 6,480,446 | B1 | 11/2002 | Ko |
| 6,578,163 | B2 | 6/2003 | Ko |
| 6,643,232 | B2 | 11/2003 | Ko |
| 6,674,697 | B1 | 1/2004 | Ko |
| 6,691,265 | B2 * | 2/2004 | Kim et al. .................. 714/723 |
| 6,894,963 | B2 | 5/2005 | Ko |
| 6,937,552 | B2 | 8/2005 | Ko |
| 6,952,385 | B2 | 10/2005 | Ko |
| 7,133,333 | B2 | 11/2006 | Ko |
| 7,139,935 | B2 * | 11/2006 | Park et al. ....................... 714/8 |

FOREIGN PATENT DOCUMENTS

| | | |
|---|---|---|
| EP | 0 350 920 | 3/1994 |
| EP | 0 798 716 | 10/1997 |
| EP | 0 866 456 | 9/1998 |
| JP | 04-28061 | 1/1992 |
| JP | 2000-3562 | 1/2000 |
| JP | 2003-91938 | 3/2003 |
| KR | 1991-8495 | 10/1991 |
| WO | WO 98/14938 | 9/1998 |

OTHER PUBLICATIONS

European Search Report Communication issued by European Patent Office in European Patent Application No. 03077453 on Oct. 7, 2003.

Australian Search Report Communication issued by Australian Patent Office in European Patent Application 0350920 on Feb. 11, 2004.

Japanese Office Action issued by Japanese Patent Office in Japanese Divisional Application No. 2002-199228 on Jul. 20, 2004 (related to present application).

Japanese Office Action issued by Japanese Patent Office in Japanese Patent Application No. 2002-199228 on Sep. 27, 2005 (related to present application).

U.S. Appl. No. 11/295,593, filed Dec. 5, 2005, Jung-wan Ko, Samsung Electronics Co., Ltd.

U.S Appl. No. 12/020,807, filed Jan. 28, 2008, Jung-wan Ko, Samsung Electronics Co., Ltd.

U.S. Appl. No. 12/022,377, filed Jan. 30, 2008, Jung-wan Ko, Samsung Electronics Co., Ltd.

* cited by examiner

FIG. 3

| BP | Contents | Number of bytes |
|---|---|---|
| 0 to 1 | DDS Identifier(0A0Ah) | 2bytes |
| 2 | Reserved | 1byte |
| 3 | Disc certification Flag | 1byte |
| 4 to 7 | DDS/PDL update counter | 4bytes |
| 8 to 9 | Number of Groups | 2bytes |
| 10 to 15 | Reserved | 6bytes |
| 16 | Group certification for Group0 | |
| 17 | Group certification for Group1 | |
| ... | ... | |
| 39 | Group certification for Group23 | |
| 40 to 79 | Reserved | 64bytes |
| 80 to 2047 | Reserved | 1968bytes |

FIG. 4A

| b7 | b6 | b5 | b4 | b3 | b2 | b1 | b0 |
|---|---|---|---|---|---|---|---|
| In-Process | | Reserved | | | | User Certification | Disc Manufuncturer Certification |

FIG. 4B

| b7 | b6 | b5 | b4 | b3 | b2 | b1 | b0 |
|---|---|---|---|---|---|---|---|
| In-Process | | Reserved | | | | User Certification | Reserved |

FIG. 5

| BP | Contents | Number of bytes |
|---|---|---|
| 0 to 1 | SDL Identifier(0002h) | 2bytes |
| 2 to 3 | Reserved | 2bytes |
| 4 to 7 | SDL update counter | 4bytes |
| 8 to 15 | Spare area full flag | 8bytes |
| 16 to 19 | DDS/PDL, update counter | 4bytes |
| 20 to 21 | Reserved | 2bytes |
| 22 to 23 | number of SDL entries | 2bytes |
| 24 to 31 | first SDL entry | 8bytes |
| ... | ... | ... |
| m to m+7 | last SDL entry | 8bytes |

FIG. 6

| Reserved | Group23 | Group22 | Group21 | ... | Group2 | Group1 | Group0 |
|---|---|---|---|---|---|---|---|
| b63 ... b24 | b23 | b22 | b21 | b20 ... b3 | b2 | b1 | b0 |

FIG. 7

| FRM | Reserved | Sector number of the first sector in the defective block | Reserved | Sector number of the first sector in the replacement block |
|---|---|---|---|---|
| b63 | b62 ... b56 | b55 ... b32 | b31 ... b24 | b23 ... b0 |

FIG. 8A

| b7 | b6 | b5 | b4 | b3 | b2 | b1 | b0 |
|---|---|---|---|---|---|---|---|
| In-Process | | Reserved | | | Disc Defect Management Mode | User Certification | Disc Defect Manufacturer Certification |

FIG. 8B

| b7 | b6 | b5 | b4 | b3 | b2 | b1 | b0 |
|---|---|---|---|---|---|---|---|
| In-Process | | Reserved | | | Disc Defect Management Mode | User Certification | Reserved |

FIG. 12

| Zone | # of sect per rev | Start Sector Number (Hex) | Guard Area | # of Guard blk | Group No. | User Area Sector number | User Area # of blk | Spare area Sector number | Spare area # of blk | Guard area | End sector number |
|---|---|---|---|---|---|---|---|---|---|---|---|
| 0 | 25 | 31000 | — | 0 | 0 | 31000 – 398DF | 2190 | — | 0 | 398E0 – 3991F | 3991F |
| 1 | 26 | 39DD0 | 39920 – 3995F | 4 | 1 | 39960 – 4381F | 2540 | — | 0 | 43820 – 4385F | 4385F |
| 2 | 27 | 441F0 | 43860 – 4389F | 4 | 2 | 438A0 – 4DD7F | 2638 | — | 0 | 4DD80 – 4DDBF | 4DDBF |
| 3 | 28 | 4EC60 | 4DDC0 – 4DDFF | 4 | 3 | 4DE00 – 588FF | 2736 | — | 0 | 58900 – 5893F | 5893F |
| 4 | 29 | 59D20 | 58840 – 5887F | 4 | 4 | 58980 – 63A9F | 2834 | — | 0 | 63AA0 – 63ADF | 63ADF |
| 5 | 30 | 65430 | 63AE0 – 63B1F | 4 | 5 | 63B20 – 8F25F | 2932 | — | 0 | 8F260 – 8F29F | 8F29F |
| 6 | 31 | 71190 | 6F2A0 – 6F2DF | 4 | 6 | 6F2E0 – 7B03F | 3030 | — | 0 | 7B040 – 7B07F | 7B07F |
| 7 | 32 | 7D540 | 7B080 – 7B0BF | 4 | 7 | 7B0C0 – 8743F | 3128 | — | 0 | 87440 – 8747F | 8747F |
| 8 | 33 | 59F40 | 87480 – 874CF | 5 | 8 | 874D0 – 93E4F | 3224 | — | 0 | 93E50 – 93E9F | 93E9F |
| 9 | 34 | 96F90 | 93EA0 – 93EEF | 5 | 9 | 93EF0 – A0E8F | 3322 | — | 0 | A0E90 – A0EDF | A0EDF |
| 10 | 35 | A4630 | A0EE0 – A0F2F | 5 | 10 | A0F30 – AE4EF | 3420 | — | 0 | AE4F0 – AE53F | AE53F |
| 11 | 36 | B2320 | AE540 – AE58F | 5 | 11 | AE590 – BC18F | 3518 | — | 0 | BC170 – BC1BF | BC1BF |
| 12 | 37 | C0660 | BC1C0 – BC20F | 5 | 12 | BC210 – CA40F | 3616 | — | 0 | CA410 – CA45F | CA45F |
| 13 | 38 | CEFF0 | CA460 – CA4AF | 5 | 13 | CA4B0 – D8CCF | 3714 | — | 0 | D8CD0 – D8D1F | D8D1F |
| 14 | 39 | DDFD0 | D8D20 – D8D6F | 5 | 14 | D8D70 – E7BAF | 3812 | — | 0 | E7BB0 – E7BFF | E7BFF |
| 15 | 40 | ED600 | E7C00 – E7C4F | 5 | 15 | E7C50 – F70AF | 3910 | — | 0 | F70B0 – F70FF | F70FF |
| 16 | 41 | FD280 | F7100 – F715F | 6 | 16 | F7160 – 106DBF | 4006 | — | 0 | 106DC0 – 106C1F | 106C1F |
| 17 | 42 | 10D550 | 106C20 – 106C7F | 6 | 17 | 106C80 – 116CFF | 4104 | — | 0 | 116D00 – 116D5F | 116D5F |
| 18 | 43 | 11DE70 | 116D60 – 116DBF | 6 | 18 | 116DC0 – 12745F | 4202 | — | 0 | 127460 – 1274BF | 1274BF |
| 19 | 44 | 12EDE0 | 1274C0 – 12751F | 6 | 19 | 127520 – 1381DF | 4300 | — | 0 | 1381E0 – 13823F | 13823F |
| 20 | 45 | 1403A0 | 138240 – 13829F | 6 | 20 | 1382A0 – 14957F | 4398 | — | 0 | 149580 – 1495DF | 1495DF |
| 21 | 46 | 151FB0 | 1495E0 – 14963F | 6 | 21 | 149640 – 15AF3F | 4496 | — | 0 | 15AF40 – 15AF9F | 15AF9F |
| 22 | 47 | 164210 | 15AFA0 – 15AFFF | 6 | 22 | 15B000 – 16CF1F | 4594 | — | 0 | 16CF20 – 16CF7F | 16CF7F |
| 23 | 48 | 176AC0 | 16CF80 – 16CFDF | 6 | 23 | 16CFE0 – 17F51F | 4692 | — | 0 | 17F520 – 17F57F | 17F57F |
| 24 | 49 | 1899C0 | 17F580 – 17F5EF | 7 | 24 | 17F5F0 – 19212F | 4788 | — | 0 | 192130 – 19219F | 19219F |
| 25 | 50 | 19CF10 | 1921A0 – 19220F | 7 | 25 | 192210 – 1A536F | 4886 | — | 0 | 1A5370 – 1A53DF | 1A53DF |
| 26 | 51 | 1B0AB0 | 1A53E0 – 1A544F | 7 | 26 | 1A5450 – 1B8BCF | 4984 | — | 0 | 1B8BD0 – 1B8C3F | 1B8C3F |
| 27 | 52 | 1C4CA0 | 1B8C40 – 1B8CAF | 7 | 27 | 1B8CB0 – 1CCA4F | 5082 | — | 0 | 1CCA50 – 1CCABF | 1CCABF |
| 28 | 53 | 1D94E0 | 1CCAC0 – 1CCB2F | 7 | 28 | 1CCB30 – 1E0EEF | 5180 | — | 0 | 1E0EF0 – 1E0F5F | 1E0F5F |
| 29 | 54 | 1EE370 | 1E0F60 – 1E0FCF | 7 | 29 | 1E0FD0 – 1F59AF | 5278 | — | 0 | 1F59B0 – 1F5A1F | 1F5A1F |
| 30 | 55 | 203850 | 1F5A20 – 1F5A8F | 7 | 30 | 1F5A90 – 20AA8F | 5376 | — | 0 | 20AA90 – 20AAFF | 20AAFF |
| 31 | 56 | 2193B0 | 20AB00 – 20AB6F | 8 | 31 | 20AB70 – 2201BF | 5474 | — | 0 | 220190 – 2201FF | 2201FF |
| 32 | 57 | 22F500 | 220200 – 22027F | 8 | 32 | 220280 – 235E9F | 5570 | — | 0 | 235EA0 – 235F1F | 235F1F |
| 33 | 58 | 245CD0 | 235F20 – 235F9F | 8 | 33 | 235FA0 – 24C1DF | 5668 | — | 0 | 24C1E0 – 24C25F | 24C25F |
| 34 | 59 | 25CAF0 | 24C260 – 24C2DF | 8 | 34 | 24C2E0 – 26329F | 5884 | 2632A0 – 26509F | 480 | — | 26509F |

RECORDING MEDIUM FOR STORING DEFECT MANAGEMENT INFORMATION FOR RECORDING REAL TIME DATA, DEFECT MANAGING METHOD THEREFOR, AND REAL TIME DATA RECORDING METHOD

CROSS-REFERENCE TO RELATED APPLICATIONS

This application is a Continuation Application of application Ser. No. 11/295,593 filed Dec. 7, 2005, now pending, which is a Continuation Application of application Ser. No. 10/631,826 filed Aug. 1, 2003, which issued as U.S. Pat. No. 7,133,333, which is a Continuation Application of application Ser. No. 10/107,395 filed Mar. 28, 2002, which issued as U.S. Pat. No. 6,643,232, which is a Divisional Application of application Ser. No. 09/294,344, filed Apr. 20, 1999, which issued as U.S. Pat. No. 6,480,446, the disclosures of which are incorporated by reference. This application also claims the benefit of Korean Application Nos. 98-14059, filed Apr. 20, 1998; 98-23913, filed Jun. 24, 1998; 98-29733, filed Jul. 23, 1998; 98-34880, filed Aug. 27, 1998; and 98-35847, filed Sep. 1, 1998, in the Korean Patent Office, the disclosures of which were filed in application Ser. No. 09/294,344 and are incorporated herein.

BACKGROUND OF THE INVENTION

1. Field of the Invention

The present invention relates to the field of managing a disk and its defects, and more particularly, to a recording medium for storing defect management information with respect to whether linear replacement is used, a method of effectively managing defects to record and/or reproduce video and/or audio data from a digital versatile disc random access memory (DVD-RAM) in real time, and a method of recording data in real time using defect management information.

2. Description of the Related Art

Real time recording or reproduction means that a given amount of data is necessarily recorded or reproduced within a given time since input information is lost if it is not processed at the moment data is input, and since a phenomenon such as a pause of an image or temporary interruption of music occurs with reproduction of data as abnormal information if data is not recorded or reproduced at a predetermined speed. The above-described problems are caused since the input of information cannot be temporally controlled by a recording and reproducing apparatus.

In the DVD-RAM standard version 1.0, a method of managing defects generated on a disk has been disclosed to increase the reliability of data recorded on the disk. Slipping replacement and linear replacement are included as the disclosed defect management methods: the first method processes defects detected in an initializing process; and the second method replaces an error correction code (ECC) block unit (16-sector unit) including a sector having a defect generated during use of the disc with a defect-free ECC block in a spare area.

The slipping replacement is used to minimize a reduction in the recording or reproduction speed due to defects, in which a logical sector number to be provided to a defective sector is provided to a sector next to the defective sector detected during a certification process for investigating defects of a disc when the disc is initialized, that is, data is recorded or reproduced by slipping a sector on which a defect is generated during recording or reproduction. Here, a real physical sector number is pushed back by the sector number designated by slipping the defective sector. Such a left-behind phenomenon is solved by using as many sectors as there are defects in a spare area located at the end portion of a corresponding user data area.

However, the slipping replacement cannot be used for a defect generated while a disc is used. When a defective portion is disregarded and skipped, discontinuity is generated on logical sector numbering, which means that the slipping replacement violates file system rules. Thus, the linear replacement is used when a defect is generated during use of the disc, which means the replacement of an ECC block including a defective sector with an ECC block existing in a spare area.

When the linear replacement is used, no vacuum exists in a logical sector number, however, the position of a sector on a disc is discontinuous, and real data corresponding to a defective ECC block exists in the spare area.

As described above, when real time recording, in which the time for temporarily-input information cannot be arbitrarily delayed, such as, recording of broadcast information or a real image, is necessary, information is recorded in an area to be linearly-replaced by undergoing a process in which a pickup goes up to the spare area and searches for an area to be linearly replaced, and a process in which the pickup comes back. Hence, the recording speed is reduced, so that information input in real time cannot be continuously recorded when the linear replacement is used.

It is prescribed that a DVD-RAM drive according to the DVD-RAM standard version 1.0 processes all of this defect management to reduce the burden of the host computer used in the drive. The host computer is designed to transmit a command ordered not to manage defects to the drive using a command denoted in an interface standard. That is, if the host computer determines whether defect management will be performed, the defect management itself is supposed to be performed by the drive.

Even when the host computer does not manage defects according to the need of an application program, the DVD-RAM disc according to the DVD-RAM standard version 1.0 must necessarily manage defects recorded in a primary defect list (PDL) and a secondary defect list (SDL) according to a defect management rule if an area slippingly replaced or linearly replaced due to defect management performed by another drive exists. Here, it is prescribed that the position of a defective sector replaced according to slipping replacement should be recorded in the PDL, and the position of a defective block replaced according to linear replacement should be recorded in the SDL. That is, when data is recorded after setting the fact that a specific drive should not perform defect management using the linear replacement, it cannot be ensured that other drives must also not perform the linear replacement on the same disc.

Therefore, when real time recording is performed by a current DVD-RAM disc, it may be difficult because of an area to be used by the linear replacement.

SUMMARY OF THE INVENTION

To solve the above problems, it is an object of the present invention to provide a recording medium for storing defect management information associated with whether linear replacement is used or not, to record real time data.

It is another object of the present invention to provide a recording medium for storing information for showing a plurality of different defect management modes according to the type of data to be recorded.

It is still another object of the present invention to provide a recording medium for allocating a spare area for only real time recording whose space can be effectively utilized.

It is yet another object of the present invention to provide a method of managing a defect of a recording medium which can record real time data and can have maximum compatibility with a general DVD-RAM disc.

It is still yet another object of the present invention to provide a method of recording real time data using the defect management information associated with whether the linear replacement is used.

Additional objects and advantages of the invention will be set forth in part in the description which follows and, in part, will be obvious from the description, or may be learned by practice of the invention.

Accordingly, to achieve the above and other objects of the present invention, there is provided a recording medium including a user data area, a spare area and a control information area, wherein the control information area stores information representing use or non-use of linear replacement defect management in which a defective area on the recording medium is replaced with the spare area.

To further achieve the above and other objects of the present invention, there is provided a recording medium for storing defect management mode information for showing a plurality of defect management modes representing use or non-use of linear replacement according to the type of data to be recorded.

To still further achieve the above and other objects of the present invention, there is provided a recording medium for storing information representing non-application of linear replacement to all data to be recorded in a user data area on the recording medium in a defect management area, in which only a spare area for slipping replacement is allocated.

To still yet further achieve the above and other objects of the present invention, there is provided a defect managing method according to the present invention for a disc recording and/or reproducing apparatus comprising the steps of: (a) recording information representing use or non-use of linear replacement defect management with respect to the entire disc or a specific area of the disc; and (b) determining whether a defective area of the disc will be replaced by a block in a spare area of the disc using linear replacement according to information representing use or non-use of the linear replacement defect management.

To still yet further achieve the above and other objects of the present invention, there is provided a method of recording real time data while managing a defect on a disc using a disc recording and/or reproducing apparatus, the method comprising the steps of: (a) determining whether defect management mode information representing whether defect management based on linear replacement is to be used; (b) determining whether data to be recorded is real time data, when the defect management mode information is information that the linear replacement is not to be used; (c) determining whether a linearly-replaced detect exists in an area to record data in, when the data to be recorded is real time data; and (d) determining whether a new defect is detected in the area to record data in, when no linearly-replaced defect exists in the area to record data in, and recording the real time data in a desired area when the new defect is not detected.

BRIEF DESCRIPTION OF THE DRAWINGS

The above objects and advantages of the present invention will become more apparent by describing in detail preferred embodiments thereof with reference to the attached drawings, in which:

FIG. 3 is a table of a defect definition structure (DDS);

FIGS. 4A and 4B illustrate the structures of a disc certification flag and a group certification flag shown in FIG. 3, respectively;

FIG. 5 is a table of the contents of a secondary defect list (SDL);

FIG. 6 illustrates the structure of the spare area full flag shown in FIG. 5;

FIG. 7 illustrates the structure of the SDL entry shown in FIG. 5;

FIGS. 8A and 8B illustrate the structures of the disc certification flag and the group certification flag of the DDS for recording real time data proposed by the present invention, respectively;

FIG. 12 is a table showing allocated spare areas for recording real time data proposed by the present invention.

DETAILED DESCRIPTION OF THE PREFERRED EMBODIMENTS

Figure 1:
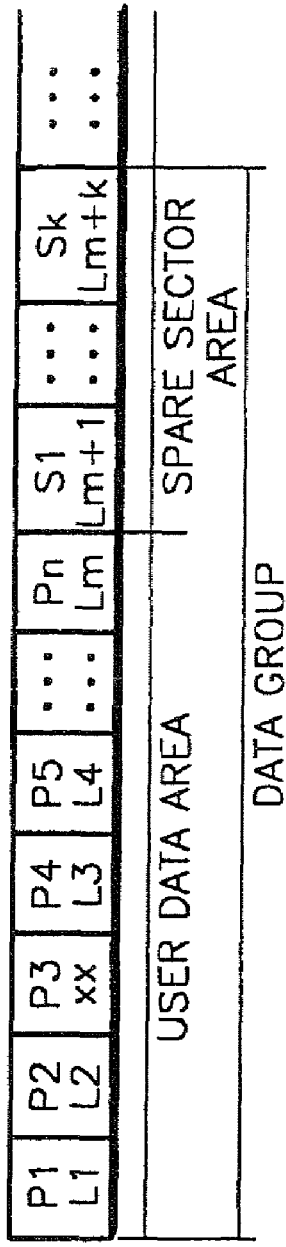
FIG. 1 is a view for explaining a defect management method using slipping replacement of a recording medium.

Preferred embodiments of a recording medium storing defect management information for recording real time data, a defect managing method using the same, and a real time data recording method will now be described with reference to the attached drawings. Like reference numerals refer to like elements throughout.

First, slipping replacement and linear replacement will be described in detail referring to FIGS. 1 and 2 in order to help in the understanding of the present invention.

FIG. 1 is a view for explaining a defect management method using the slipping replacement. Physical addresses on a disc shown in FIG. 1 are recorded as P1, P2, P3, . . . , Pn, and logical addresses L1, L2, L3 . . . must be provided to record real data in these physically-segmented sectors. These logical addresses act as addresses allowing a real file system to search for its own data. However, the relationship between the physical addresses and the logical addresses is made in a disc initialization process. If a defect is detected on the third physical sector P3 as shown in FIG. 1, a logical address is not designated to this defective sector, and a logical sector number L3 is designated to the next physical sector P4. Then, the logical sectors are sequentially pushed back by the number of defective sectors, and a spare area located at the end of a corresponding data group is used by the pushed portion. In this slipping replacement method, effective processing in sector units is possible by simply slipping a defective region, and a pickup does not need to move to a different place upon recording and reproduction by simply disregarding and skipping a defective portion. Thus, the defective region can be avoided while minimizing the delay time. Here, the position of a defective sector replaced by the slipping replacement is recorded in the PDL.

Figure 2:
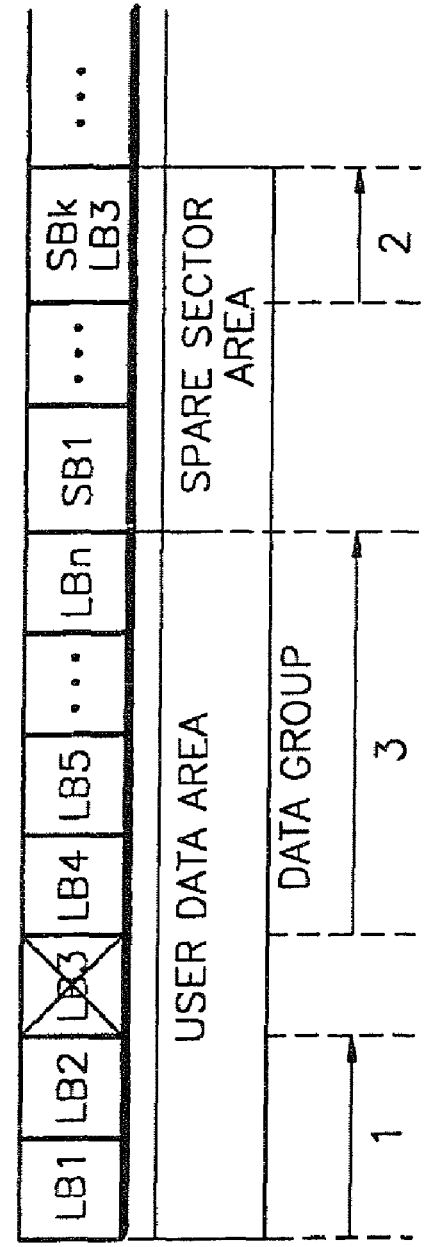
FIG. 2 is a view for explaining a defect management method using linear replacement of a recording medium.

FIG. 2 is a view for explaining a defect management method using linear replacement. In the linear replacement for processing defects generated while a disc is used after being initialized, the defects are managed in an ECC block unit, i.e., in units of 16 sectors. In other words, when an error is generated at a specific sector and a defect is thus detected, if the movement in units of at least 16 sectors is not made for error correction, the error correction unit of each data previously recorded in a disc must be changed. Thus, processing in an ECC block unit must be performed, and the slipping replacement method of slipping a defective sector and designating a logical sector cannot be used since the logical address of an area where data has already been recorded cannot be changed. When a defect is generated in a logical block LB3 as shown in FIG. 2, the defective region is recorded in the SDL to be prevented from being used, and the defective portion is replaced with a usable block existing in a spare area. The replaced block (SBk in FIG. 2) in the spare area has the same logical block number (LB3) as the erroneous block.

In a reproduction sequence, as shown in FIG. 2, reading is continued just before a defective block in an area 1, a replaced ECC block existing in the spare area is read by moving a pickup or the like to an area 2, and data is continuously read from a block right next to the defective block in an area 3. In order to process defects as described above, a pickup performs the process for searching for data and a process for returning to the block right next to the defective block after reading the replaced block. Thus, much time is required to read or write data, so that this defect management is not appropriate for real time recording.

In the present invention, a disc (recording medium) includes a control information area for storing general information (which includes a defect management area (DMA) for storing defect management information) and a user area for writing/rewriting user data. The user area includes a user data area and a spare area, and the control information area includes a lead-in area or a lead-out area. The DMA includes a disc definition structure (DDS), a primary defect list (PDL) and a secondary defect list (SDL).

FIG. 3 is a table of the disc definition structure (DDS) existing in the defect management area (DMA) of a DVD-RAM, which is in the lead-in area or the lead-out area of the control information area. In particular, a byte position (BP) 3, a disc certification flag, records the certified contents of the entire disc, and BPs 16 through 39, group certification flags, record the contents of certification of 24 data groups.

In addition, BPs 0 and 1 are DDS identifiers, and BPs 4 through 7 are the values of counters for updating DDS/PDL representing the total number of times in which a DDS/PDL block is updated and rewritten. That is, when initialization starts, the value of a counter is set to be "0", and increases by one whenever the DDS/PDL is updated or rewritten. All DDS/PDL and SDL blocks must have the same counter value after formatting is completed. BPs 8 and 9 denote the number of groups, and, for example, 24 groups are recorded as "0018" (hexadecimal).

FIG. 4A illustrates the structure of the disc certification flag shown in FIG. 3. When a bit b7 among three bits b7, b6 and b5 representing an in-process state is "0b", it indicates format completion, and when the bit b7 is "1b", it indicates an under-formation state. When the bit b6 is "0b", it indicates the progress of formatting using full certification, and when the bit b6 is "1b", it indicates the progress of formatting using partial certification. When the bit b5 is "0b", it indicates the progress of formatting on the entire disc, and when the bit b5 is "1b", it indicates the progress of formatting on only groups, and indicates that the group certification flag is effective.

When a bit b1 representing user certification is "0b", it indicates that a disc has never been certified by a user, and when the bit b1 is "1b", it indicates that a disc has been certified one or more times by a user. When a bit b0 representing disc manufacturer certification is "0b", it indicates that a disc has never been certified by a manufacturer, and when the bit 0 is "1b", it indicates that the disc has been certified one or more times by the manufacturer. Other bits b4, b3, and b2 are reserved. However, "in-process" is set to be "1xx" by any certification before formatting, (where the symbol "x" means a 'don't care bit,' i.e., "1" or "0" and when formatting is completed, the "in-process" is reset to be "000".

FIG. 4B illustrates the structure of each of the group certification flags of the bit positions 16 through 39 shown in FIG. 3. When a bit b7 among two bits b7 and b6 representing an in-process state is "0b", it indicates format completion of a corresponding group, and when the bit b7 is "1b", it indicates that the corresponding group is being formatted. When the bit b6 is "0b", it indicates that the group is being formatted using full certification, and when the bit b6 is "1b", it indicates that the group is being formatted using partial certification. When a bit b1 representing user certification is "0b", it indicates that the group has never been certified by a user, and when the bit b1 is "1b", it indicates that the group has been certified one or more times by a user. Other bits b5, b4, b3, b2, and b0 are reserved.

FIG. 5 is a table showing the contents of a secondary defect list (SDL). BP is the position of a relative byte starting with 0. Relative byte positions 0 and 1 are SDL identifiers, and relative byte positions 2 and 3 are reserved. Relative byte positions 4 through 7 denote the total number of updated SDL blocks, and the SDL updating counter value increases by one whenever the content of SDL is updated. Relative byte positions 8 through 15 denote spare area full flags, and relative byte positions 16 through 19 denote DDS/PDL updating counter values each indicating the total number of times the DDS/PDL block is updated and rewritten. The counter value is set to be "0" when initialization starts, and increases by 1 whenever the DDS/PLD is updated or rewritten. As mentioned above, all the DDS/PDL and SDL blocks must have the same count value after formatting is finished. Relative byte positions 20 and 21 are reserved, and relative byte positions 22 and 23 indicate the number of entries in the SDL. The remaining relative byte positions indicate each SDL entry.

FIG. 6 illustrates the structure of the spare area full flag of the relative byte positions 8 through 15 shown in FIG. 5. In FIG. 6, if a bit representing a corresponding group is "1", it indicates that no spare blocks are left in the corresponding group, and if the bit is "0", it indicates that a spare block remains in the corresponding group.

FIG. 7 illustrates the structure of the SDL entry shown in FIG. 5. In FIG. 7, FRM (Forced Re-Assignment Marking) is a bit representing whether a defective block has been replaced. When the defective block has been replaced, FRM records a binary "0", and when the deflective block has not been replaced or no spare areas exist, FRM records a binary "1". The SDL entry includes the sector number of the first sector of a defective block, and the sector number of the first sector of a replacement block. Here, if the defective block has not been replaced, a hexadecimal "000000" is record in an area where the first sector number of the replacement block is recorded.

Meanwhile, in real time recording, whether corresponding data can be processed within a given time becomes more important than some errors of real data. In particular, in the case of an image or the like, an error is generated to part of a screen when a small error exists in the image. On the other hand, when input data cannot be processed in time, continuous data error is generated to make normal reproduction impossible. Therefore, the processing of data in time is more important.

Thus, as for the real time recording, a method allowing for non-use of the linear replacement must be suggested. When the linear replacement is not used, there must be a portion recording the fact that a corresponding disc is in use without using the linear replacement. A method of recording such a content will be described referring to FIGS. 8A and 8B.

FIGS. 8A and 8B illustrate the structures of the disc certification flag and the group certification flag of the DDS proposed by the present invention to record real time data, respectively. The structures of the disc certification flag and the group certification flag of FIGS. 8A and 8B are the same as those of FIGS. 4A and 4B except for a bit position b2. That is, as shown in FIG. 8A, when the entire corresponding disc is used without the linear replacement, the bit position b2 of the disc certification flag is set as "1", and when the corresponding disc is used by the linear replacement as in the prior art, the bit position b2 is set as "0". In FIGS. 8A and 8B, information associated with use or non-use of the linear replacement stored in the bit position b2 is called a disc defect management mode.

Also, when only specific groups are partially initialized to prevent the linear replacement, as shown in FIG. 8B, the bit position b2 of the group certification flag for a corresponding group is set as "1" to indicate that linear replacement is not performed on a data region in the corresponding group. In an embodiment of the present invention, the bit positions b2 of the disc certification flag and the group certification flag are used as shown in FIGS. 8A and 8B, but another reserved bit can be used. Here, each existing b2 region is reserved, and its value is recorded as "0".

When the bit b2 for a disc defect management mode of the disc certification flag or group certification flag is set as "1" upon initialization of a disc, the SDL records only the start sector address of a block having a defect generated during use of the disc, records an FRM bit of the SDL entry as "1", and the linear replacement is not performed. A hexadecimal "000000" is recorded in an area for recording the first sector number of a replacement block of the SDL entry.

In this way, while compatibility between a defect managing method based on a current DVD-RAM standard and a method of the present invention is maintained, i.e., while a method capable of indicating the existence of non-linearly-replaced blocks as in an existing defect managing method is suggested, a method allowing a defective block not to be linearly replaced is also provided to thereby accomplish recording and reproduction of real time data.

A determination of whether a defective region will be replaced by a block existing in a spare area using linear replacement is made by information associated with use or non-use of linear replacement defect management recorded in a defect management region on the entire disc or in a specific area of the disc regardless of the type of data to be recorded in a corresponding area.

Also, a determination of whether a defective region will be replaced by a block existing in a spare area using the linear replacement is made by information associated with use or non-use of linear replacement defect management recorded in a defect management region on the entire disc or in a specific area on the disc in the case of only data required to be recorded in real time.

A method of preventing linear replacement with respect to the entire disc or specific groups of the disc was described on the basis of the above-described embodiment. In another embodiment, when a disc defect management mode is set as "1", it can be used as information that the linear replacement is not performed with respect to a block having a defect in an area of a disc for recording information requiring real time recording and reproduction, but the linear replacement can be performed with respect to an area of a disc not requiring real time recording. In this case, when data not requiring real time recording has already been recorded in an area in which real time data must be recorded, and a defective region is thus linearly replaced, the linear replacement of the defective region must be capable of being canceled. Therefore, when the disc defect management mode is set as "1", this can mean that the linear replacement of the defect can be canceled when real time information is recorded.

In order to prevent entire linear replacement with respect to the entire disc or a given group on the disc, information associated with the disc defect management mode is set as "1" upon initialization. On the other hand, when linear replacement is not performed only in the case of recording real time data, there is no need to set the defect management mode information upon initialization. That is, when it is determined that there is a necessity for recording real time data in a disc, the disc defect management mode is set as "1" just before the real time data is recorded. At this time, a determination of whether a disc is suitable for recording real time data is made on the basis of the amount or distribution of a defect generated on the disc. When it is determined that the disc is suitable, the disc defect management mode is set as "1". Otherwise, a process for informing a user that the disc is not suitable for recording real time data is required.

Figure 9:
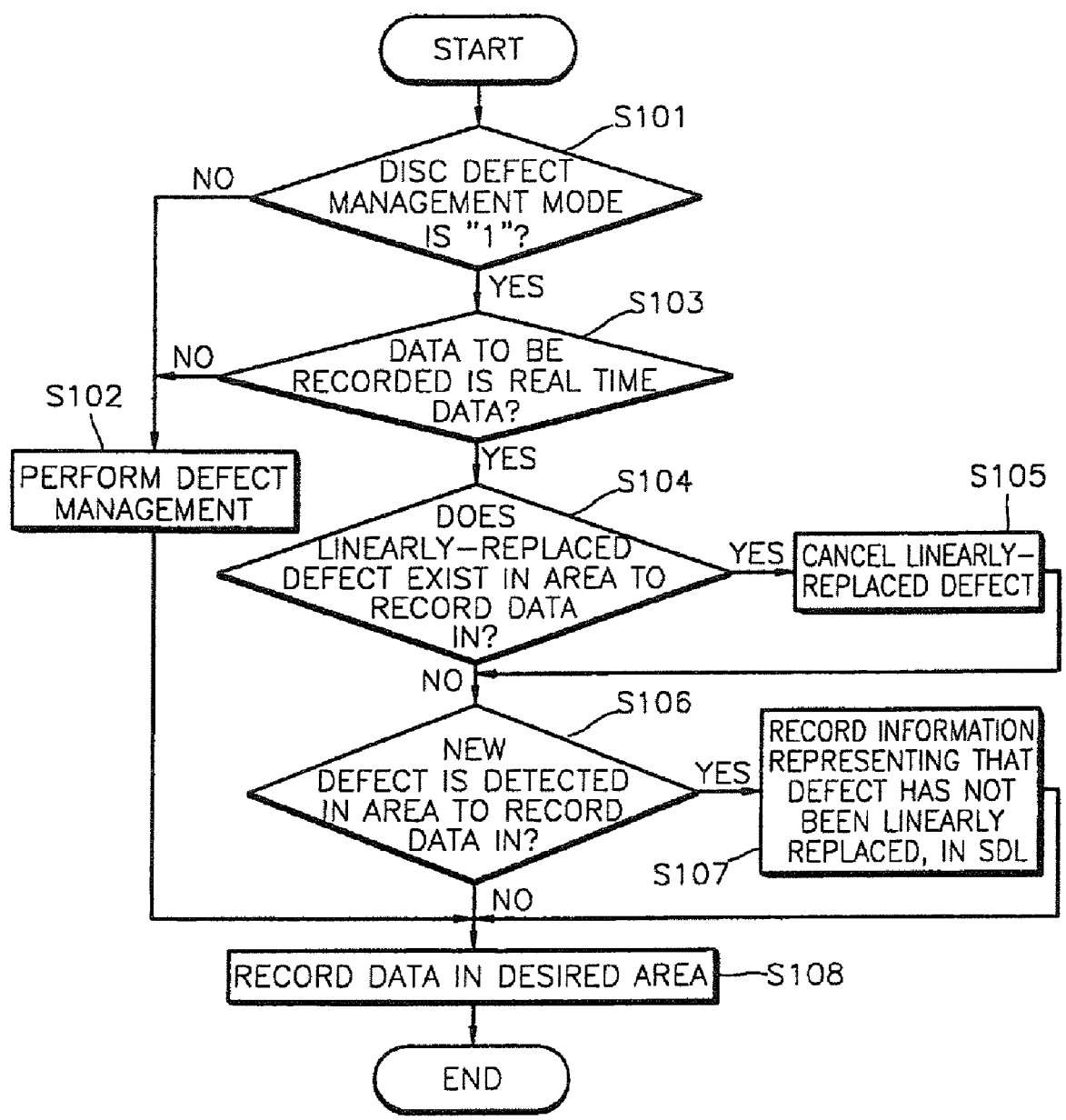
FIG. 9 is a flowchart illustrating a method of recording data according to a defect management method according to an embodiment of the present invention.

FIG. 9 is a flowchart illustrating a method of recording data in real time without performing defect management using linear replacement with respect to only data desired to be recorded when the disc defect management mode is "1".

In FIG. 9, first, a determination of whether a disc defect management mode is "1" is set before recording of data on a disc begins, in step S101. If the disc defect management mode is "1" it is determined whether data to be recorded is real time data, in step S103. If the defect management mode is "0", every data is recorded on the basis of a general defect managing method defined in the standard book version 1.0, in steps S102 and S108. When it is determined in step S103 that data to be recorded is not real time data, step S102 of performing general defect management is performed. When it is determined in step S103 that data to be recorded is real time data, it is determined whether an already-linearly-replaced defect exists in an area where data is to be recorded, in step S104.

When it is determined in step S104 that the linearly-replaced defect exists in the area to record data in, the linearly-replaced defect is canceled, in step S105. When no linearly-replaced defect exists in the area to record data in, it is determined whether a newly-detected defect exists in the area to record data in, in step S106.

When it is determined in step S106 that a new defect is detected, information representing that a defect has not been linearly replaced is recorded in a secondary defect list (SDL) of a defect management area, in step S107. Next, data is recorded in a desired area in step S108. Also, when a new defect is not detected in step S106, step S108 of recording real time data in a desired region is performed.

Step S105 of canceling a linearly-replaced defect, and step S107 of recording information representing that a defect has not been linearly replaced are performed by recording the first sector number of a replacement block as a hexadecimal "000000", among linearly-replaced defect information recorded in the SDL, and by recording the FRM information as "1". In this case, since the disc defect management mode is set as "1", it can be recognized from the comparison of this mode information with FRM information that the meaning of the FRM information becomes different from that of existing FRM information.

That is, the FRM information based on the existing standard denotes that a block having a defect generated for a certain reason has not been replaced with a block in a spare area or no spare areas can be replaced. On the other hand, FRM information based on a new definition is added to the meaning of the existing FRM and can be information representing that when the disc defect management mode is "1", the linear replacement of a defective block replaced by an existing linear replacement method has been canceled for real time recording, or the defective block has not been linearly replaced for real time recording.

Since a disc whose defect management mode is set as "1" is likely to include real time information, the disc can be utilized as information of prohibiting reallocation of information on a disc without consideration of real time information. Piece collection of collecting the pieces of a file on a disc, and read after reallocation can be included as a method of reallocating the information on a disc. The read after allocation is a method of reading data and then replacing a data block likely to have a defect with a block located in a spare area.

Figure 10:
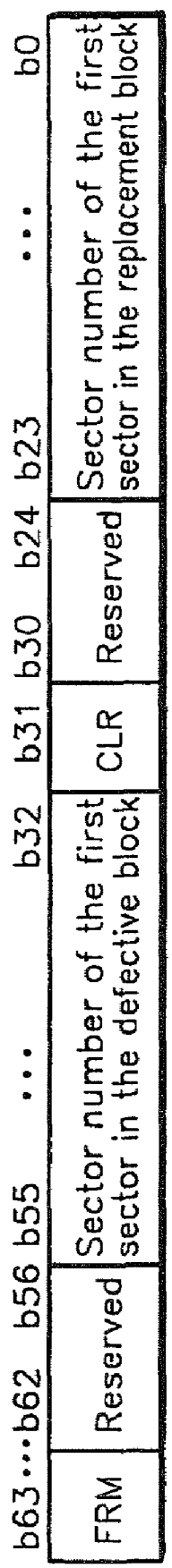
FIG. 10 illustrates an example of the structure of an improved SDL entry for canceling linear replacement proposed by the present invention.

FIG. 10 illustrates the structure of an improved SDL entry for canceling linear replacement proposed by the present invention. When an already-replaced defect exists on a disc upon recording of real time data, a method of recording the information of an area, in which the first sector number of the replacement block as described above is recorded, as a hexadecimal "000000" and setting an FRM bit as "1" is exemplified as a process for canceling the linear replacement.

This method can minimize the change in the existing standard. However, in this method, the information of a block which is determined as defective and replaced must be deleted, so that linear replacement may be arbitrarily performed, canceled, and again performed without sequentially using a spare area. In particular, when a linearly-replaced block in the spare area is defective and again replaced, information associated with the linearly-replaced defective block in the spare area is lost.

Thus, it would be preferable that blocks in a corresponding spare area are sequentially used when linear replacement occurs, and that even when the linear replacement is canceled, information associated with a block in the spare area replacing a corresponding defect block is maintained. When only a region recording an FRM bit and the first sector number of a replacement block is used to maintain information associated with the replaced sector number of the spare area, it is not possible to tell if the corresponding replaced block has again been replaced on account of a defect or if the linear replacement has been canceled to record real time data.

In order to solve such a problem, a canceled linear replacement (CLR) flag is newly defined by using a spare bit of the SDL entry which is not in use. When linear replacement with respect to a corresponding SDL entry is canceled for recording real time data, a method of setting the CLR flag as "1" can be used. Here, when the CLR flag is set as "0", it indicates a replacement block allocated without being used by real time data. In the structure of an SDL entry of FIG. 10, for example, a bit b31 not in use is used as the CLR flag.

Meanwhile, defect management information for recording real time data can be roughly divided into three cases in which: (1) real time data is not recorded on the entire disc; (2) two types of data, i.e., real time data and non-real time data, coexist on a disc, and a linear replacement defect managing method is not used with respect to only the real time data; and (3) only the real time data is recorded in the entire disc, i.e., the linear replacement defect managing method is not used with respect to all the recorded data.

Particularly, in the third case, real time replacement is not used for the entire disc, so that a spare area for defect management can be set to a smaller size than in the first and second cases. This will be described in detail later referring to FIGS. 12 and 13.

When these three or more defect managing methods are applied to one disc, various correspondences are possible according to the purpose of use of a disc, and the disc can be more effectively used. However, considering a condition such as the case of changing and using discs between reproduction apparatuses, the defect management conditions in which a corresponding disc is used must be described in more detail. 1-bit disc defect management mode information representing use or non-use of linear replacement described in FIGS. 8A and 8B is deficient for defect management information in the above case.

Figure 11:
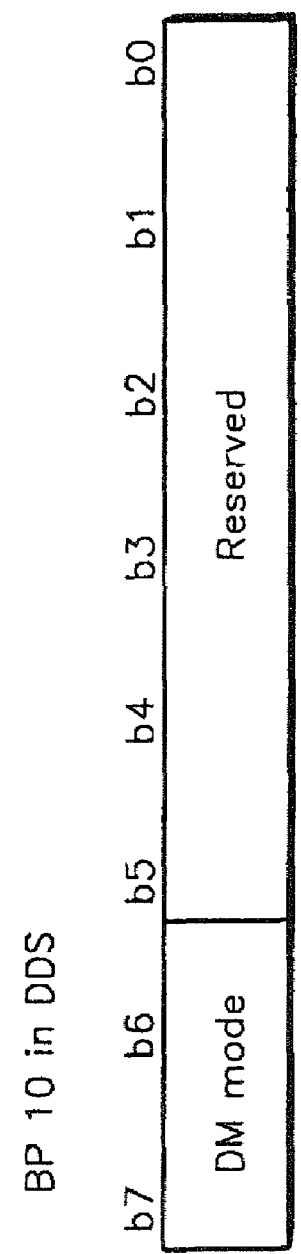
FIG. 11 illustrates an example of a DDS for storing information for indicating a plurality of different defect management modes proposed by the present invention.

Thus, as shown in FIG. 11, defect management mode information capable of representing linear replacement or non-linear replacement depending on a plurality of different defect management modes is stored in a reserved byte located in the DDS of the defect management area (DMA) on a disc. That is, FIG. 11 shows the case of using two significant bits b7 and b6 of the relative byte position BP10 of DDS, i.e., the eleventh byte thereof, by determining a defect management (DM) mode depending on use or non-use of linear replacement as an example.

As shown in FIG. 11, when the DM mode information is "00b", it indicates that the slipping replacement and the linear replacement are applied to all the data recorded in a user data area on a disc, when the DM mode information is "01b", it indicates that the linear replacement is selectively applied according to the type of information (here, real time data and non-real time data), and when the DM mode information is "10b", it indicates that the linear replacement is not used with respect to all the data in the user data area.

That is, when the DM mode information is "00b", the slipping replacement and the linear replacement are mandatory, and this mode is only for data other than real time data in the first case described above. When the DM mode information is "01b", the linear replacement is mandatory, but the linear replacement for real time data is optional. This mode is defect management for a hybrid disc including both real time data and non-real time data in the second case described above. When the DM mode information is "10b", only the slipping replacement is allowable, and this mode is defect management for only real data in the third case described above. When the DM mode information is "10b", the physical layout of a disc can be changed.

Meanwhile, since linear replacement cannot be used to record real time data, a spare area necessary for linear replacement does not actually become necessary. For this case, in the present invention, only a spare area for slipping replacement is set in the last group without allocating a spare area for linear replacement as shown in FIG. 12. In particular, the spare area set in the last group (here, a thirty fourth group) allocates 7680 sectors (480 ECC blocks) to a spare area for slipping replacement to process a maximum of 7679 entries capable of being registered in a primary defect list (PDL). In FIG. 12, "sect" denotes a sector, "blk" denotes block, and "rev" denotes revolutions.

Figure 13:
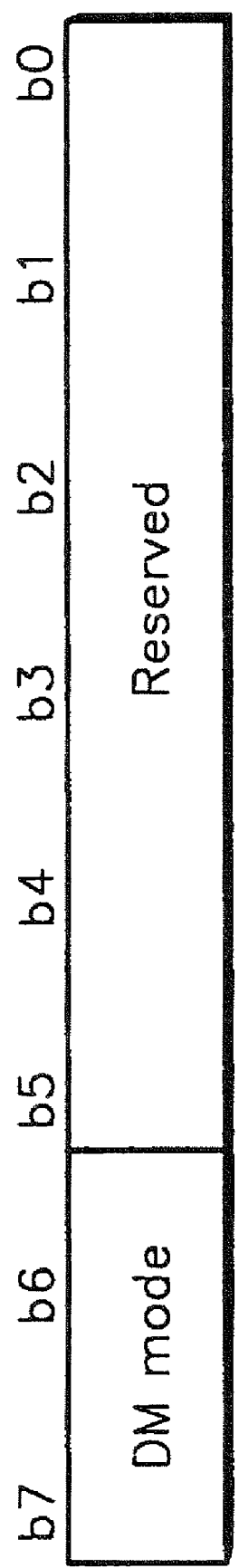
FIG. 13 illustrates a DDS and the structure of a primary defect list (PDL) for storing defect management mode information proposed by the present invention for allocating spare areas for only real time recording shown in FIG. 12.

In order to obtain the compatibility between the present invention and an existing defect management structure, a flag, capable of discriminating a case in which spare areas for only slipping replacement are allocated only for real time recording from a case in which spare areas for linear replacement and slipping replacement are allocated according to an existing defect management method, is represented with significant bits b7 and b6 of the relative byte position BP 10 in the DDS and the PDL, as shown in FIG. 13.

As shown in FIG. 13, when two significant bits b7 and b6 representing a DM mode on the byte position BP 10 of the DDS/PDL are "00b", it indicates that an existing defect managing method is applied, and when the two significant bits b7 and b6 are "10b", a defect managing method for only real time recording without linear replacement, in which only the spare area for slipping replacement is allocated in the last group of a disc, is applied. Thus, spare areas are allocated by a method dedicated for real time recording, thereby increasing the efficiency due to the application of the space of a disc.

As described above, while compatibility between a method of the present invention and a defect managing method based on the current DVD-RAM standard is maintained, linear replacement is not performed when real time data is recorded. Thus, real time data can be recorded and reproduced.

In the present invention, information representing a plurality of different defect management modes depending on the type of data to be recorded is stored, so that various correspondences are possible according to the purpose of use of the recording medium. Thus, the recording medium can be more effectively used.

Also, in the present invention, when real time data is recorded, a spare area for linear replacement is not used for real time data. Also, only the real time data is recorded in the entire disc and the spare area is allocated to be used for only slipping replacement. Thus, the effectiveness due to the application of the space of a disc can be increased.

What is claimed is:

1. A method for reproducing information recorded in an optical recording medium comprising a data area, the method comprising:

reproducing a defect list comprising information on a defective block detected in the data area, from a predetermined area of the optical recording medium; and reproducing the information recorded in the optical recording medium using the defect list, wherein the information on the defective block comprises information on whether data recorded in the defective block have been recorded in another block, and location information on the defective block.

* * * * *